(12) United States Patent
Boyaci et al.

(10) Patent No.: US 8,260,264 B2
(45) Date of Patent: Sep. 4, 2012

(54) AUTOMATED RETRIEVAL AND HANDLING OF A SECOND TELECOMMUNICATIONS TERMINAL'S VOICEMAIL BY A FIRST TERMINAL

(75) Inventors: Omer Boyaci, Ahmetpasa (TR); Lynne Shapiro Brotman, Westfield, NJ (US); Parameshwaran Krishnan, Basking Ridge, NJ (US); Michael J. Sammon, Watchung, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 780 days.

(21) Appl. No.: 12/201,053

(22) Filed: Aug. 29, 2008

(65) Prior Publication Data

US 2010/0056111 A1 Mar. 4, 2010

(51) Int. Cl.
*H04M 3/493* (2006.01)
(52) U.S. Cl. .................. 455/412.2; 455/413; 379/88.12; 379/88.22; 379/88.23; 379/88.24; 379/88.25
(58) Field of Classification Search ............... 455/412.1, 455/412.2, 413; 379/88.12, 88.22, 88.23, 379/88.24, 88.25
See application file for complete search history.

(56) References Cited

U.S. PATENT DOCUMENTS

| 6,389,115 B1* | 5/2002 | Swistock ............... 379/88.12 |
| 2006/0008059 A1* | 1/2006 | Ying et al. ............ 379/88.17 |
| 2010/0273526 A1* | 10/2010 | Rajan et al. ............ 455/557 |

* cited by examiner

*Primary Examiner* — Jean Gelin
*Assistant Examiner* — Amanuel Lebassi

(57) ABSTRACT

An apparatus and method are disclosed that enable a terminal such as a computer-based softphone to retrieve and handle, transparently for its user, the voicemail that has been left by calling parties who called the user's cell-phone number. Furthermore, the softphone is able to integrate the presentation to its user of the voicemail associated with the cell phone with the voicemail that has been left by calling parties who called the softphone itself. The softphone features both i) a personal area network interface that is used to communicate directly with the cell phone and ii) a local area network interface that is used to retrieve the cell-phone voicemail from a voicemail system. Once the softphone is paired with the cell phone, the softphone is able to retrieve signals directly from the cell phone and, based on those signals, retrieves the voicemail from the cell phone's voicemail system.

20 Claims, 4 Drawing Sheets

AUTOMATED RETRIEVAL AND HANDLING OF A SECOND TELECOMMUNICATIONS TERMINAL'S VOICEMAIL BY A FIRST TERMINAL

FIELD OF THE INVENTION

The present invention relates to telecommunications in general, and, more particularly, to the retrieval and handling of a second terminal's voicemail by a first terminal.

BACKGROUND OF THE INVENTION

A cellular telephone is a portable communication device that is used extensively by business enterprise personnel. As a portal of telephony communication, the cellular telephone (or "cell phone") provides mobile communication to its user, thereby enabling the user to be reached most anywhere and at any time. And when a calling party is unable to reach the called user—for instance, because the cell phone user is currently on an airplane—the calling party is able to leave a voicemail message for the cell phone user. Later, the cell phone user can then retrieve the voicemail message left.

A personal computer is another communication device that is used extensively by business enterprise personnel. As a portal of data communication, enabling exchanges of email and instant messaging, the computer can also be furnished with a "softphone" software application that enables the computer to act as a telephone. A notebook computer, or other type of portable computer, further enhances its user's ability to communicate with others most anywhere and at any time.

Given the extensive use of the cell phone and a softphone on a personal computer, integrating at least some aspects of these two portals of communication through one device would be desirable.

SUMMARY OF THE INVENTION

One aspect of communication that is common to both a cell phone and a softphone running on a personal computer is the ability to retrieve and handle voicemail. Typically, however, the voicemail system associated with the cell phone user account and the voicemail system associated with the softphone user account are different from each other. In other words, the common user of the cell phone and softphone has to manage separate voicemail accounts. This can be cumbersome to the user, especially when there are voicemails important to the common user that are left on two different voicemail systems.

The present invention enables the softphone functionality that is resident on a personal computer to retrieve and handle, transparently for its user, the voicemail that has been left by calling parties who called the cell-phone number (i.e., the "cell-phone voicemail"). Furthermore, in accordance with the illustrative embodiment of the present invention, the softphone is able to integrate the presentation to its user of the cell-phone voicemail with the voicemail that has been left by calling parties who called the softphone itself (i.e., the "softphone voicemail"). This is in contrast to some techniques in the prior art, in which the softphone handled only its own voicemail, and the user had to explicitly call into the voicemail system associated with the cell phone in order to retrieve the cell-phone voicemail messages.

The softphone of the illustrative embodiment features both i) a personal area network (PAN) interface that is used to communicate directly with the cell phone and ii) a local area network (e.g., Ethernet, etc.) interface that is used to retrieve the cell-phone voicemail from a voicemail system. The PAN is a computer network used for direct communication between the personal computer-based softphone and the cell phone. The coverage area of the PAN is considered short-range, in that it is typically only a few meters across. In accordance with the illustrative embodiment, the PAN used by the terminals to communicate directly with each other operates in conformity with the Bluetooth specification.

The softphone of the illustrative embodiment receives from the cell phone, via the personal area network, an indication that a voicemail message is waiting or that the cell phone missed a call, in which case a voicemail message might have been left. Transparently to its user, the softphone then retrieves the voicemail from the cell phone's voicemail system. The softphone then converts to text some or all of the retrieved audio and displays the text on an associated display, such as the computer monitor. The softphone's user can then manipulate the displayed messages by using the softphone's user interface.

Although the illustrative embodiment features a personal computer-based softphone paired with a cellular telephone, it will be clear to those skilled in the art, after reading this specification, how to make and use alternative embodiments that feature another type of terminal that is capable of performing the tasks described herein and a second terminal for which voicemail has been left and is to be retrieved by the first terminal.

A first telecommunications terminal of the illustrative embodiment comprises: a personal area network interface for receiving, directly from a second telecommunications terminal, a first signal that represents one of i) an indication that a message is waiting and ii) an indication that a call has been missed; a processor for dialing an access number of a voicemail system that stores voicemail messages on behalf of the second terminal, the dialing being based on the receiving of the first signal; and a local area network interface for i) transmitting a second signal that represents the access number and ii) receiving, in response to the transmitting of the second signal, a third signal that represents a first audio portion of a voicemail message.

DETAILED DESCRIPTION

Figure 1:
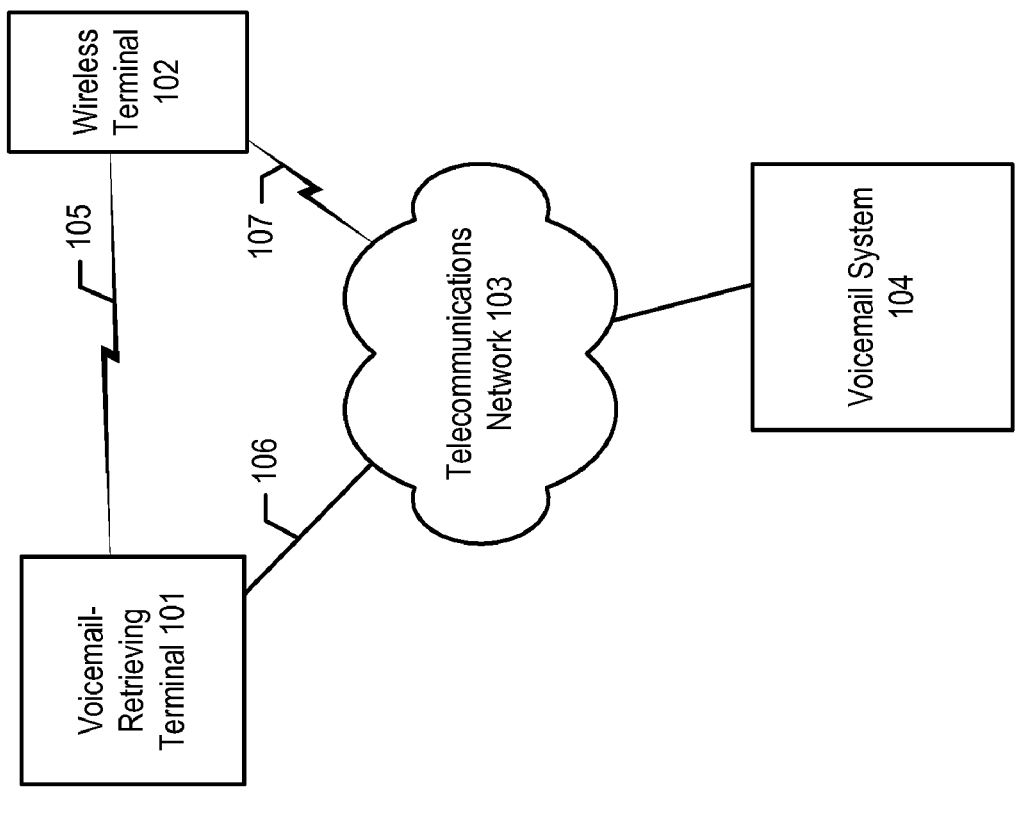
FIG. 1 depicts a schematic diagram of telecommunications system 100 in accordance with the illustrative embodiment of the present invention.

FIG. 1 depicts a schematic diagram of telecommunications system 100 in accordance with the illustrative embodiment of the present invention. System 100 comprises voicemail-retrieving terminal 101, wireless terminal 102, telecommunications network 103, and voicemail system 104, interconnected as shown.

Terminal 101 is a voicemail retrieving, telecommunications device that is capable of handling a telephone call for its user, as well as retrieving and handling voicemail that has been left for the user of wireless terminal 102, in accordance with the illustrative embodiment of the present invention. Terminal 101 is able to call, or to be called by, another terminal or device within telecommunications system 100. For example, terminal 101 is able to dial an access number that routes to voicemail system 104.

In accordance with the illustrative embodiment, terminal 101 is a softphone terminal. A softphone terminal is the combination of a general-purpose, personal computer and a softphone software application that runs on the computer. The resident softphone application enables terminal 101's user to make and receive telephone calls through the computer (e.g., notebook, desktop, handheld, etc.). However, it will be clear to those skilled in the art, after reading this specification, how to make and use alternative embodiments of the present invention in which terminal 101 is another type of terminal that is capable of executing software or firmware that embodies at least some of the tasks of the illustrative embodiment, such as a SIP- or IP-capable deskset or even another cellular phone in addition to terminal 102.

Telecommunications terminal 101 is capable of performing the voicemail retrieval-related tasks and voicemail handling-related tasks of the illustrative embodiment. The salient components of terminal 101 that enable the performing of the tasks are described below and with respect to FIG. 2. The salient tasks that are performed by terminal 101 are described below and with respect to FIG. 3.

Wireless terminal 102 is a telecommunications device that is capable of handling a telephone call for its user. Terminal 102 is able to call, or to be called by, another terminal or device within telecommunications system 100. For example, a calling party might attempt to call terminal 102 by dialing a telephone number that routes to wireless terminal 102.

For pedagogical purposes, terminal 102 is a cellular telephone. However, it will be clear to those skilled in the art, after reading this specification, how to make and use embodiments of the present invention in which terminal 102 is a different type of terminal than a cell phone.

In accordance with the illustrative embodiment, retrieving terminal 101 is able to communicate directly with wireless terminal 102 via a personal area network connection, depicted as connection 105. As is known in the art, a personal area network (PAN) is a computer network used for communication among computer devices and telecommunications devices close to a person, such as terminals 101 and 102. The coverage area of a PAN is considered short-range, in that it is typically only a few meters across. In accordance with the illustrative embodiment, the PAN used by terminals 101 and 102 to communicate directly with each other operates in accordance with the Bluetooth specification. Additionally, the direct communications between terminals 101 and 102 is conducted over a secure, globally unlicensed Industrial, Scientific, and Medical (ISM) radio-frequency bandwidth in the 2.4 GHz range.

In some alternative embodiments, terminals 101 and 102 communicate directly with each other via a different radio-frequency bandwidth and/or another type of wireless PAN, such as one based on the IrDA, UWB, or ZigBee specification. In some other alternative embodiments, terminals 101 and 102 communicate directly via a wired PAN, such as one based on USB or FireWire.

Telecommunications network 103 provides the connectivity among various telecommunications terminals in system 100 and enables the transport and control of communications signals between two or more terminals per call. The communications signals convey bitstreams of encoded media such as audio, video, and so forth. To this end, network 103 comprises one or more interconnected data-processing systems such as switches, servers, routers, and gateways, as are well-known in the art.

In accordance with the illustrative embodiment, network 103 comprises a variety of subnetworks for the purpose of providing connectivity to their constituent devices. For example, network 103 comprises a local area network (LAN) for the purpose of providing connectivity to terminal 101. In accordance with the illustrative embodiment, terminal 101 connects to the LAN via wired Ethernet connection 106, while in some alternative embodiments, the connection to the LAN is wireless. Additionally, network 103 comprises a cellular network for the purpose of providing connectivity to wireless terminal 102. In accordance with the illustrative embodiment, terminal 102 connects to the cellular network via radio-frequency link 107, which is provided by whatever radio base station is assigned to handle terminal 102 at any particular moment.

Network 103 further comprises an Internet Protocol-based (IP-based), service provider's network for the purpose of transporting voice signals—between voicemail system 104 and terminal 101, for example. Although network 103 in the illustrative embodiment comprises an IP-based network, such as a Voice-over-IP (VoIP) network, network 103 could alternatively or additionally comprise another type of network. These alternative types of service provider networks might be the Internet, some other type of IP-based network, or some other type of packet-based network, such as the Public Switched Telephone Network, as those who are skilled in the art will appreciate.

Voicemail system 104 comprises a server that stores voicemail associated with wireless terminal 102, as well as for other wireless terminals supported by the same cellular service provider. In accordance with the illustrative embodiment, system 104 does not store the voicemail associated with retrieving terminal 101; this is because system 104 is operated by the cellular service provider of wireless terminal 102, and the cellular service provider provides voicemail system 104 only for use by its own wireless users. In some alternative embodiments, however, voicemail system 104 might also provide voicemail storage for terminal 101's voicemail as well, but even in this case the storage for terminal 101's voicemail is separate from the storage for terminal 102's voicemail (i.e., is managed under a separate telephone number or customer account).

Figure 2:
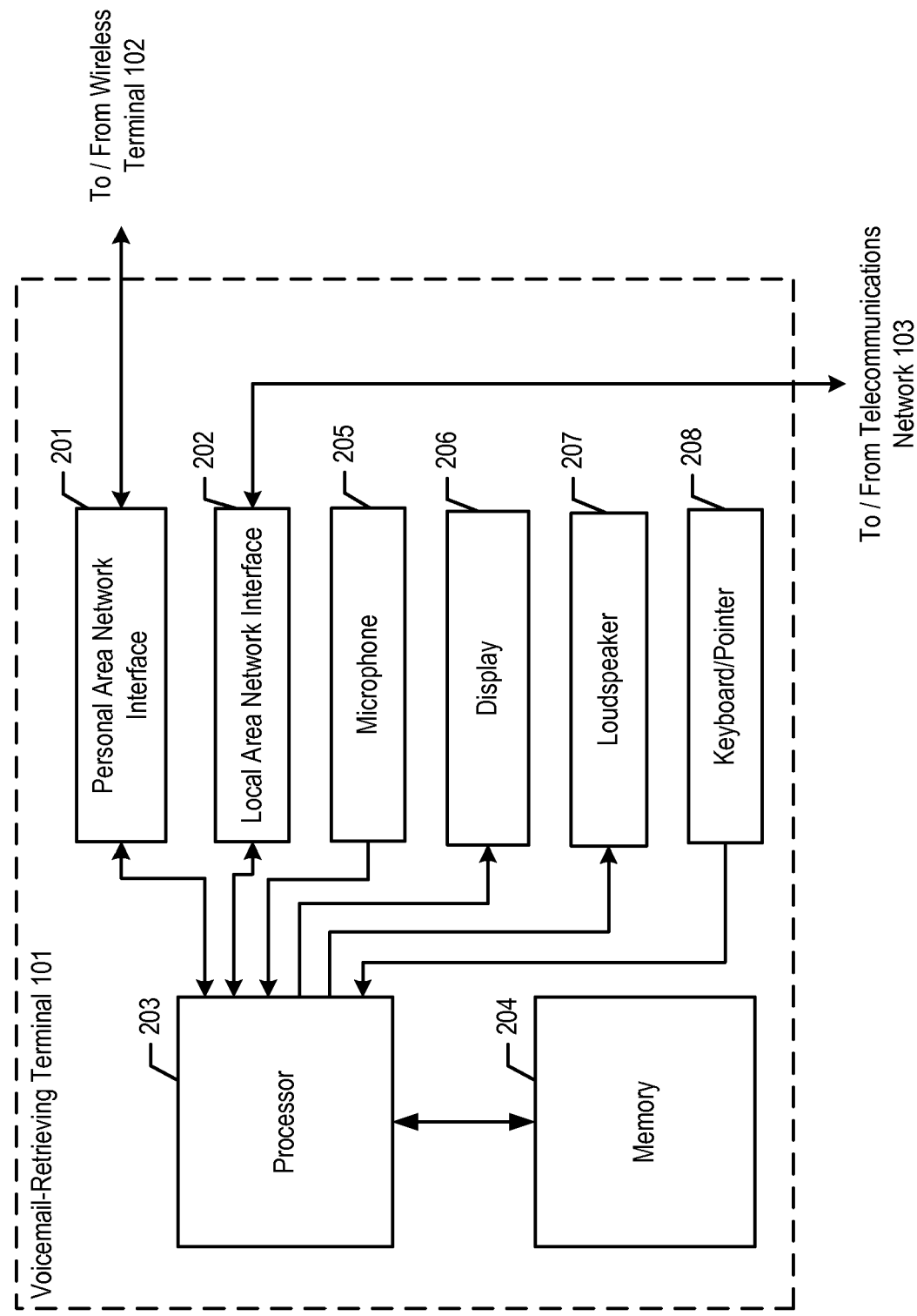
FIG. 2 is a block diagram of the salient components of terminal 101, which operates within system 100.

FIG. 2 is a block diagram of the salient components of voicemail-retrieving terminal 101 in accordance with the illustrative embodiment of the present invention. The depicted components are interconnected as shown. In accordance with the illustrative embodiment, telecommunications terminal 101 comprises:

i. personal area network interface 201,
    ii. local area network interface 202,
    iii. processor 203,
    iv. memory 204,
    v. microphone 205,
    vi. display 206,
    vii. loudspeaker 207, and
    viii. keyboard/pointer 208.

It will be clear to those skilled in the art, after reading this disclosure, how to make and use alternative embodiments of the present invention in which telecommunications terminal 101 comprises any subcombination of the components listed above.

Personal area network (PAN) interface 201 enables terminal 101 to receive signals directly from and transmit signals directly to terminal 102, in well-known fashion. In accordance with the illustrative embodiment, terminal 101 receives and transmits control signals via PAN interface 201 in well-known fashion. For example, PAN interface 201 receives an indication from terminal 102 that a voicemail message is waiting for the user of terminal 102. In some embodiments, terminal 101 receives and transmits audio signals as well via PAN interface 201. In any event, it will be clear to those skilled in the art how to make and user PAN interface 201.

Local area network (LAN) interface 202 enables terminal 101 to receive signals from and transmit signals to one or more devices within telecommunications network 103, as well as voicemail server 104, in well-known fashion. In accordance with the illustrative embodiment, terminal 101 receives and transmits control signals via LAN interface 202 in well-known fashion. Additionally, LAN interface 202 receives and transmits media waveform signals in well-known fashion, such as audio signals that are encoded via the ITU G.729 standard (or other standard) and represented in Voice over Internet Protocol (VoIP) packet streams of data. As those who are skilled in the art will appreciate, in some alternative embodiments terminal 101 receives and transmits media waveform signals that are encoded and/or represented in a different format. It will be clear to those skilled in the art how to make and user LAN interface 202.

Processor 203 is a general-purpose processor that is capable of receiving information from PAN interface 201, LAN interface 202, microphone 205, and keyboard/pointer 208, of executing instructions stored in memory 204 such as those that correspond to some or all of the tasks of the illustrative embodiment, of reading data from and writing data into memory 204, and of transmitting information to PAN interface 201 and LAN interface 202. Additionally, processor 203 is able to provide signals to display 206 and loudspeaker 207. Processor 203 is also able to perform voice recognition on signals received from microphone 205 and speech-to-text conversion on signals received from PAN interface 201 or LAN interface 202.

In some alternative embodiments of the present invention, processor 203 might be a special-purpose processor. In some other alternative embodiments, the functionality performed by processor 203 might be divided up among multiple processors (e.g., one for speech-to-text conversion, another for general processing, etc.).

Memory 204 stores the instructions and data used by processor 203, in well-known fashion. Memory 204 can be any combination of dynamic random-access memory (RAM), flash memory, disk drive memory, and so forth. In accordance with the illustrative embodiment, memory 204 is further capable of storing audio signals received from voicemail system 104, as well as text converted from those audio signals received.

Microphone 205 is a transducer that is able to receive acoustic signals and to convert them to electrical signals for transmission and/or storage. It will be clear to those skilled in the art how to make and use microphone 205.

Display 206 is a device that is able to present the terminal's user with a visual representation of information, including text that has been converted from audio signals received from system 104. It will be clear to those skilled on the art how to make and use display 206.

Loudspeaker 207 is an electro-acoustic transducer that is able to present the terminal's user with an audible representation of information. As those who are skilled in the art will appreciate, in some alternative embodiments of terminal 101, loudspeaker 207 can instead be a type of electro-acoustic transducer other than a loudspeaker, such as an earpiece. In any event, it will be clear to those skilled on the art how to make and use loudspeaker 207.

Keyboard/pointer 208 is a keyboard-based and/or pointer-based device that is able to accept user input signals and to convert them to electrical signals for the purpose of controlling other elements of terminal 101. It will be clear to those skilled in the art how to make and use keyboard/pointer 208.

In accordance with the illustrative embodiment, processor 203 of terminal 101 performs the tasks described below and with respect to FIG. 3. As those who are skilled in the art will appreciate, in some alternative embodiments, two or more components within terminal 101 can perform different subsets of the described tasks.

Figure 3:
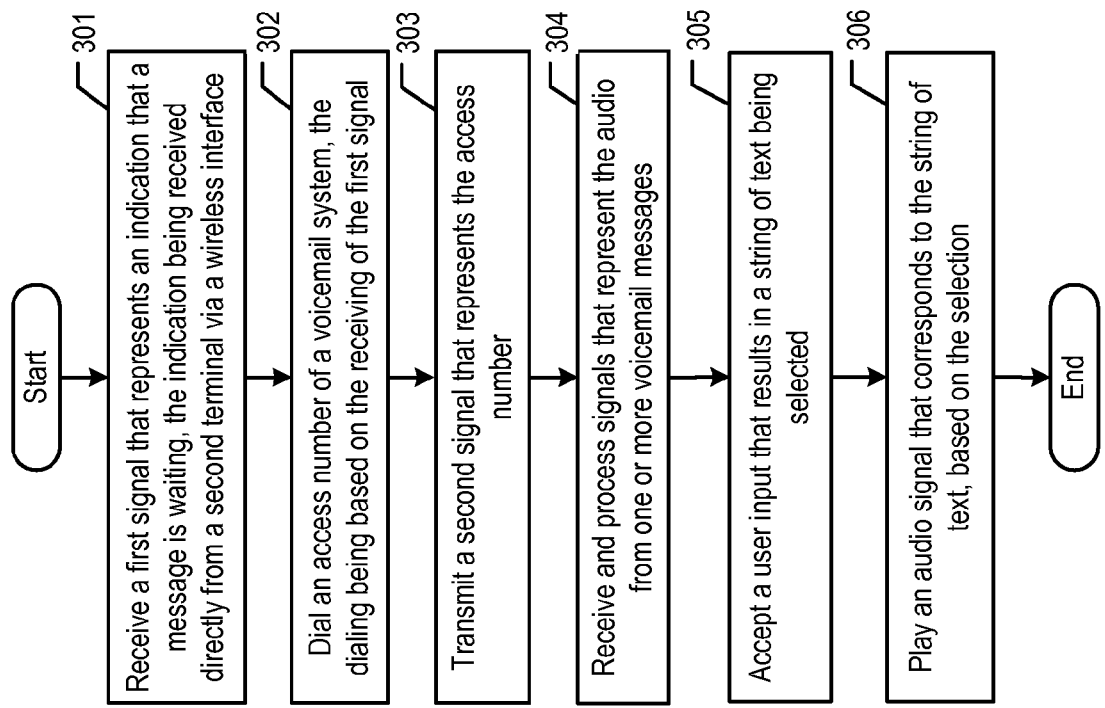
FIG. 3 depicts flowcharts of the salient tasks performed by terminal 101, in accordance with the illustrative embodiment of the present invention.

FIG. 3 depicts a flowchart of the salient tasks performed by telecommunications terminal 101, in accordance with the illustrative embodiment of the present invention. As those who are skilled in the art will appreciate, in some alternative embodiments, only a subset of the depicted tasks is performed. At least some of the tasks might be performed simultaneously or in a different order from that depicted.

In the example that follows, terminal 101's user and terminal 102's user is the same person. Terminal 101 is a notebook computer, which runs a softphone application, and terminal 102 is a cellular telephone. The user of the two terminals has situated terminal 102 within close enough proximity to terminal 101, so that the two terminals are able to communicate directly with each other via a personal area network that they share. Also, the personal area network shared by terminals 101 and 102 has been initialized, so that terminals 101 and 102 are able to exchange information directly with each other.

At task 301, terminal 101 receives a first signal that represents an indication that a message is waiting. Terminal 101 receives the indication directly from terminal 102 via the personal area network interface. The message that is waiting is a voicemail message that has been left for terminal 102's user and is stored at voicemail system 104.

In some alternative embodiments, terminal 101 receives a different type of indication. For example, terminal 101 might be notified that one or more calls have been missed by terminal 102, which would cause terminal 101 to go ahead and check for any possible voicemail messages left by one or more of those callers. As those who are skilled in the art will appreciate, terminal 101 might be notified that one or more calls have been missed by terminal 102, but then presents to its user some or all of the information received from terminal 102 as part of the missed call notification; this can occur without having checked for voicemail or after having determined that no voicemail had been left.

At task 302, terminal 101 dials an access number. The dialing of the access number is based on the receiving of the first signal at task 301. In accordance with the illustrative embodiment of the present invention, terminal 101 maintains a database for one or more terminals such as terminal 102, in which a voicemail access number is stored for each terminal for which voicemail is to be retrieved by terminal 101. In this example, terminal 101 dials the particular access number that corresponds to the voicemail system of terminal 102, which in this case is voicemail system 104.

At task 303, terminal 101 transmits a second signal that represents the access number dialed at task 302. In accordance with the illustrative embodiment, terminal 101 transmits the second signal to voicemail system 104 via local area network interface 202.

Depending on the voicemail system being accessed, terminal 101 might also need to transmit one or more signals (e.g., an in-band DTMF signal, etc.), in order to command system 104 to enter a voicemail access mode. If prompted, terminal 101 then transmits a personal information number (PIN) or some other type of password in well-known fashion, in order to be granted access to the voicemail stored at system 104. It will be clear to those skilled in the art how to make and use alternative embodiments that interact with voicemail systems that require other exchanges of information prior to retrieving the actual voicemail messages.

With respect to tasks 302 and 303, in the illustrative embodiment terminal 101 calls voicemail system 104 directly. In some alternative embodiments, terminal 101 might instead transmit a command to terminal 102, via personal area network interface 201, to originate the call to voicemail system 104. Subsequently, terminal 102 (i.e., the user's cell phone) originates the call to voicemail system 104 by calling system 104's access number and then retrieving the voicemail in well-known fashion, on behalf of terminal 101.

At task 304, which is described in detail below and with respect to FIG. 4, terminal 101 receives signals that represent the audio of at least a portion of each voicemail message, for one or more voicemail messages that are stored at voicemail system 104. Terminal 101 receives the signals in response to the access number of voicemail system 104 having been called at task 303. Each audio portion represents at least part of the voicemail message header or at least part of the actual voicemail message left by the caller, or a combination of the two. The audio portion received for the voicemail message header might comprise the time and date that the voicemail message was recorded, the length in time of the voicemail message, the calling party's number, and so forth.

Terminal 101 then converts to text those audio signals that are received and displays, via display 206, the corresponding strings of text for the audio signals that are converted. As those who are skilled in the art will appreciate, terminal 101 can format and order the multiple strings of text displayed, based on some user-defined criteria such as by the date/time the message was left, by the calling number of the party who left the message, and so forth.

Additionally, terminal 101 might retrieve and store audio (or text) signals for one or more voicemail messages that have been left for the telephone number associated with the terminal's own softphone functionality, in contrast to the telephone number associated with terminal 102 (i.e., the user's cell phone). Terminal 101 might also convert these additional audio signals to strings of text and then display the strings of text. As those who are skilled in the art will appreciate, the softphone's voicemail messages and the cell phone's voicemail messages can be displayed separately or in an integrated format.

At task 305, terminal 101 accepts a user input that results in a displayed string of text being selected. For example, the user can use keyboard/pointer 208 to select a string.

At task 306, terminal 101 plays an audio signal that corresponds to the selected string of text. The audio signal played is accessed from memory 204 and is either i) the audio signal previously retrieved from voicemail system 104 that corresponds to the text string selected at task 305 or ii) a generated audio signal synthesized from the text that was converted and stored at task 304.

Terminal 101 can accept user selections and play audio signals that correspond to those selections for multiple voicemail messages that have been retrieved.

In some alternative embodiments, terminal 101 is also capable of tagging the retrieved voicemail message or messages in various ways, such as by keyword, by policy, and so forth, based on user interaction with terminal 101 in reading the messages. Additionally, terminal 101 can mark the status of each voicemail message (e.g., read/unread, high/medium/low priority, etc.), based on input from the user or according to a user-specified policy.

Figure 4:
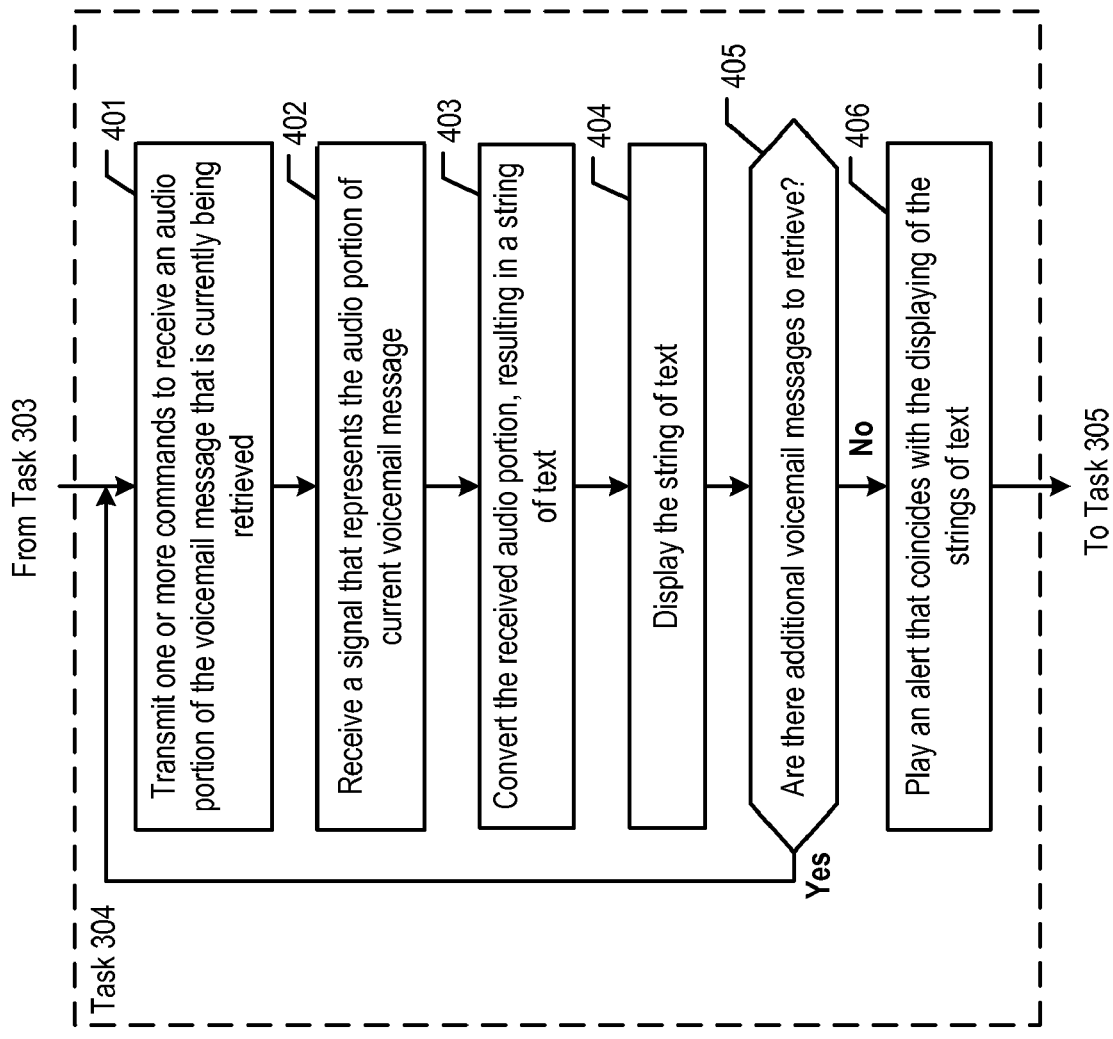
FIG. 4 depicts a flowchart of the salient subtasks, in which terminal 101 receives and processes signals that represent the audio from one or more voicemail messages.

FIG. 4 depicts a flowchart of the salient subtasks that make up task 304, in which terminal 101 receives and processes signals that represent the audio from one or more voicemail messages. As those who are skilled in the art will appreciate, in some alternative embodiments, only a subset of the depicted tasks is performed. At least some of the performed tasks might be performed simultaneously or in a different order from that depicted.

At task 401, terminal 101 transmits, in well-known fashion, one or more commands to receive an audio portion of the voicemail message that is currently being retrieved.

At task 402, terminal 101 receives a signal that represents an audio portion of the voicemail message that is currently being retrieved. As explained earlier, each audio portion represents at least part of the voicemail message header or at least part of the actual voicemail message left by the caller, or a combination of the two.

In accordance with the illustrative embodiment, terminal 101 receives the signal from voicemail system 104 via local area network interface 202. In some alternative embodiments, however, terminal 101 instead receives the signal through terminal 102 (i.e., the user's cell phone) and personal area network interface 201.

At task 403, terminal 101 converts to text the received audio portion, which results in a string of text. Depending on the content of the received audio portion, the resulting string of text might represent part of or all of the voicemail message header, part of or all of the actual message left by a calling party, or some combination of the two.

At task 404, terminal 101 displays the string of text via display 206.

At task 405, terminal 101 determines whether there are additional voicemail messages to retrieve. If there are, task execution proceeds back to task 401. Otherwise, task execution proceeds to task 406.

At task 406, terminal 101 plays, or otherwise presents, an alert that coincides with the displaying of the string or strings of converted text. The alert serves to notify the user that one or more voicemail messages have been retrieved. Terminal 101 plays the alert via loudspeaker 207. Task execution then proceeds to task 305, which is described above and with respect to FIG. 3.

The example described above features terminal 101 retrieving voicemails that are associated with a single terminal (i.e., terminal 102). It will be clear, however, those skilled in the art how to make and use embodiments of the present invention in which terminal 101, or a different terminal, communicates directly with one or more terminals other than or in addition to terminal 102 and retrieves the voicemails associated with the additional terminals, regardless of whether the voicemails are all stored at a single voicemail system (i.e., voicemail system 104) or at different voicemail systems.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A device comprising:
   a first network interface for receiving, directly from a telecommunications terminal, a first signal indicating a private voicemail message left by a caller in association with a call that has been missed by the telecommunications terminal;

a processor for dialing, based on the first signal, an access number of a voicemail system that stores voicemail messages on behalf of the telecommunications terminal; and a second network interface for transmitting a second signal that represents the access number and receiving, in response to the second signal, a third signal that represents a first audio portion of the private voicemail message.

2. The device of claim 1, wherein the processor is also for converting the first audio portion to text, resulting in a string of text.

3. The device of claim 2, further comprising a display for presenting the string of text.

4. The device of claim 3, further comprising a speaker for playing an alert that coincides with presenting the string of text on the display.

5. The device of claim 1, wherein the first network interface is a Bluetooth specification compatible network interface.

6. The device of claim 1, wherein the second network interface is an Internet Protocol compatible network interface.

7. A first telecommunications terminal comprising:

a personal area network interface for:

receiving a first signal directly from a second telecommunications terminal, the first signal indicating a private voice message left by a caller in association with a call that has been missed by the second telecommunications terminal;

receiving a third signal that represents a first audio portion of the private voice message, wherein the third signal is received in response to transmitting a second signal to the second telecommunications terminal; and transmitting the second signal to the second telecommunications terminal in response to receiving the first signal, wherein the second signal instructs the second telecommunications terminal to call an access number of a voicemail system that stores voicemail messages on behalf of the second telecommunications terminal;

a processor for converting the first audio portion to text, resulting in a string of text; and a display for presenting the string of text.

8. The first telecommunications terminal of claim 7, further comprising a speaker for playing an alert that coincides with presenting the string of text on the display.

9. The first telecommunications terminal of claim 7, wherein the personal area network interface is a Bluetooth specification compatible network interface.

10. The first telecommunications terminal of claim 7, further comprising a local area network interface for receiving an incoming call.

11. A method comprising:

receiving, at a first telecommunications terminal and directly from a second telecommunications terminal, a first signal indicating a private voicemail message left by a caller in association with a call that has been missed by the second telecommunications terminal;

dialing, based on the first signal, an access number of a voicemail system that stores voicemail messages on behalf of the second telecommunications terminal;

transmitting a second signal that represents the access number; and receiving, in response to the second signal, a third signal that represents a first audio portion of the private voicemail message.

12. The method of claim 11, further comprising converting the first audio portion to text, resulting in a first string of text.

13. The method of claim 12, further comprising displaying the first string of text.

14. The method of claim 13, further comprising:

accepting a user input that selects the first string of text; and playing an audio signal that corresponds to the first string of text, based on the user input.

15. The method of claim 13, further comprising playing an alert that coincides with displaying the first string of text.

16. The method of claim 11, wherein the first signal is based on the private voicemail message having been previously left for a user of the second telecommunications terminal.

17. The method of claim 11, wherein the second signal is transmitted via a personal area network interface.

18. The method of claim 11, wherein the second signal is transmitted via a local area network interface.

19. The method of claim 18, wherein the second signal is transmitted via a Internet Protocol compatible network.

20. The method of claim 11, wherein the first signal is received via a Bluetooth specification compatible network.

* * * * *